(12) United States Patent
Eyer

(10) Patent No.: US 10,491,966 B2
(45) Date of Patent: Nov. 26, 2019

(54) RECEPTION APPARATUS, METHOD, COMPUTER PROGRAM, AND INFORMATION PROVIDING APPARATUS FOR PROVIDING AN ALERT SERVICE

(75) Inventor: Mark Eyer, Woodinville, WA (US)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 13/559,166

(22) Filed: Jul. 26, 2012

(65) Prior Publication Data

US 2013/0036440 A1 Feb. 7, 2013

Related U.S. Application Data

(60) Provisional application No. 61/515,051, filed on Aug. 4, 2011.

(51) Int. Cl.
*H04N 7/10* (2006.01)
*H04N 5/445* (2011.01)
(Continued)

(52) U.S. Cl.
CPC .......... *H04N 21/814* (2013.01); *H04H 20/59* (2013.01); *H04L 12/1895* (2013.01); *H04N 21/472* (2013.01); *H04N 21/4882* (2013.01)

(58) Field of Classification Search
CPC ............... H04N 21/814; H04N 21/472; H04N 21/4882; H04H 20/59; H04L 12/1895
(Continued)

(56) References Cited

U.S. PATENT DOCUMENTS 6,462,665 B1 * 10/2002 Tarlton .................... G01W 1/02
340/539.1
6,816,878 B1 * 11/2004 Zimmers et al. ............. 709/200
(Continued)

FOREIGN PATENT DOCUMENTS

CN 1375162 A 10/2002
CN 1409919 A 4/2003
(Continued)

OTHER PUBLICATIONS

International Search Report and Written Opinion issued Oct. 12, 2012 in PCT/US12/49515 filed Aug. 3, 2012.
(Continued)

*Primary Examiner* — Hunter B Lonsberry
*Assistant Examiner* — Franklin Andramuno
(74) *Attorney, Agent, or Firm* — Oblon, McClelland, Maier & Neustadt, L.L.P.

(57) ABSTRACT

A reception apparatus, method, computer program, and information providing apparatus for providing one or more alert services. The reception apparatus includes a receiver, a display interface, an input unit, and a processor. The receiver receives a notification of an alert service. The display interface presents the notification of the alert service on a display. Further, the input unit receives a request from a user of the reception apparatus to subscribe to the alert service. In response to receiving the subscription request, the processor registers a location of new content information associated with the alert service in a memory. Further, the processor determines whether new content corresponding to the alert service is available based on the new content information. When the new content is determined to be available, the processor downloads the new content and causes the display interface to present a pop-up alert based on the new content.

23 Claims, 11 Drawing Sheets

(51) Int. Cl.
*H04N 21/81* (2011.01)
*H04L 12/18* (2006.01)
*H04H 20/59* (2008.01)
*H04N 21/472* (2011.01)
*H04N 21/488* (2011.01)

(58) Field of Classification Search
USPC .................................................. 725/33, 40
See application file for complete search history.

(56) References Cited

U.S. PATENT DOCUMENTS

| | | | | |
|---|---|---|---|---|
| 6,970,641 | B1* | 11/2005 | Pierre | H04N 5/76 386/239 |
| 9,507,856 | B1* | 11/2016 | Camplejohn | G06F 17/30702 |
| 2004/0061716 | A1 | 4/2004 | Cheung et al. | |
| 2004/0103434 | A1 | 5/2004 | Ellis | |
| 2005/0138660 | A1* | 6/2005 | Boyer | H04N 5/44543 725/58 |
| 2006/0156332 | A1* | 7/2006 | Kendall | 725/33 |
| 2007/0255801 | A1* | 11/2007 | Adler | 709/217 |
| 2008/0092162 | A1 | 4/2008 | Lundy et al. | |
| 2008/0201736 | A1 | 8/2008 | Gordon et al. | |
| 2008/0208962 | A1* | 8/2008 | Kim et al. | 709/203 |
| 2008/0263212 | A1* | 10/2008 | Goix | H04L 29/06027 709/228 |
| 2009/0183178 | A1* | 7/2009 | Imai | H04N 5/44543 719/318 |
| 2009/0193097 | A1* | 7/2009 | Gassewitz | G06F 15/173 709/218 |
| 2009/0204909 | A1 | 8/2009 | Hornbaker | |
| 2009/0243852 | A1* | 10/2009 | Haupt et al. | 340/541 |
| 2009/0309742 | A1* | 12/2009 | Alexander et al. | 340/601 |
| 2010/0064057 | A1 | 3/2010 | Salim et al. | |
| 2010/0077049 | A1 | 3/2010 | Appelman et al. | |
| 2010/0211442 | A1* | 8/2010 | Venkataraman | G06F 17/30029 705/14.5 |
| 2011/0010737 | A1 | 1/2011 | Bouazizi et al. | |
| 2011/0075990 | A1 | 3/2011 | Eyer | |
| 2011/0088075 | A1 | 4/2011 | Eyer | |
| 2011/0243536 | A1 | 10/2011 | Eyer | |
| 2011/0246488 | A1 | 10/2011 | Eyer | |
| 2011/0247028 | A1 | 10/2011 | Eyer | |
| 2011/0248863 | A1* | 10/2011 | Johnson et al. | 340/686.1 |
| 2011/0298981 | A1 | 12/2011 | Eyer | |
| 2011/0299827 | A1 | 12/2011 | Eyer | |
| 2011/0302599 | A1 | 12/2011 | Eyer | |
| 2011/0302611 | A1 | 12/2011 | Eyer | |
| 2011/0307920 | A1 | 12/2011 | Blanchard et al. | |
| 2012/0044418 | A1 | 2/2012 | Eyer | |
| 2012/0047531 | A1 | 2/2012 | Eyer | |
| 2012/0050619 | A1 | 3/2012 | Kitazato et al. | |
| 2012/0050620 | A1 | 3/2012 | Kitazato | |
| 2012/0054214 | A1 | 3/2012 | Yamagishi et al. | |
| 2012/0054235 | A1 | 3/2012 | Kitazato et al. | |
| 2012/0054267 | A1 | 3/2012 | Yamagishi et al. | |
| 2012/0054268 | A1 | 3/2012 | Yamagishi | |
| 2012/0054783 | A1 | 3/2012 | Yamagishi | |
| 2012/0054784 | A1 | 3/2012 | Kitazato et al. | |
| 2012/0054816 | A1 | 3/2012 | Dewa | |
| 2012/0060197 | A1 | 3/2012 | Kitahara et al. | |
| 2012/0063508 | A1 | 3/2012 | Hattori et al. | |
| 2012/0072965 | A1 | 3/2012 | Dewa | |
| 2012/0081508 | A1 | 4/2012 | Kitazato | |
| 2012/0081607 | A1 | 4/2012 | Kitazato | |
| 2012/0082266 | A1 | 4/2012 | Kitazato et al. | |
| 2012/0082440 | A1 | 4/2012 | Kitazato | |
| 2012/0084802 | A1 | 4/2012 | Kitazato | |
| 2012/0084824 | A1 | 4/2012 | Kitazato | |
| 2012/0084829 | A1 | 4/2012 | Kitazato | |
| 2012/0140265 | A1* | 6/2012 | Laursen | G06F 3/1204 358/1.15 |
| 2012/0180107 | A1* | 7/2012 | Gammill | G06Q 30/02 726/3 |
| 2012/0185888 | A1 | 7/2012 | Eyer et al. | |

FOREIGN PATENT DOCUMENTS

| | | |
|---|---|---|
| CN | 101790057 A | 7/2010 |
| KR | 10-2005-0013243 | 2/2005 |
| KR | 10/2011-0026117 | 3/2011 |
| WO | WO 2011/038012 | 3/2011 |

OTHER PUBLICATIONS

Office Action issued Apr. 21, 2016, in Chinese Patent Application No. 201280027052.7 (with English language translation).
European Extended Search Report in Application No. 12 819 224.2, dated Feb. 26, 2015 (8 pages).
European Office Action, Application No. 12 819 224.2, dated Jan. 26, 2016 (7 pages).
Summons to attend oral proceedings pursuant to Rule 115(1) EPC dated Mar. 20, 2017 for European Application No. 12189224.2-1908.
Korean Office Action dated May 23, 2018 in Korean Patent Application No. 10-2014-7000710 with English Translation citing documents AO-AQ cited therein, 14 pages.

* cited by examiner

RECEPTION APPARATUS, METHOD, COMPUTER PROGRAM, AND INFORMATION PROVIDING APPARATUS FOR PROVIDING AN ALERT SERVICE

CROSS-REFERENCE TO RELATED APPLICATION

This application is related to and claims priority under 35 U.S.C. § 119(e) to U.S. provisional patent application No. 61/515,051, filed Aug. 4, 2011, which is incorporated herein by reference in its entirety.

BACKGROUND OF THE INVENTION

1. Field of the Invention

Embodiments described herein relate generally to a reception apparatus, method, and computer program for providing an alert service. More particularly, the embodiments described herein relate generally to subscribing to, and providing, pop-up alerts for an interactive television.

2. Background

Modern televisions and set top boxes provide numerous functions in addition to presenting television programs to a user. These functions include the capability to set reminders using an electronic program guide (EPG). In one example, a user sets a reminder to watch a television program to be aired in the future. When the scheduled time of the television program is about to arrive, the television or set top box will display a notification to remind the user that the television program is about to air.

The reminders that can be set using the EPG, however, are limited by the data contained in the EPG database. As a result, the types of reminders or notifications that can be set by the user of the television or set top box are also limited.

SUMMARY OF THE INVENTION

According to an embodiment of the present invention, there is provided a reception apparatus. The reception apparatus includes a receiver, a display interface, an input unit, and a processor. The receiver receives a notification of an alert service. The display interface presents the notification of the alert service on a display. Further, the input unit receives a request from a user of the reception apparatus to subscribe to the alert service. In response to receiving the subscription request, the processor registers a location of new content information associated with the alert service in a memory. Further, the processor accesses the identified source of new content information and uses it to determine whether new content corresponding to the alert service is available. When the new content is determined to be available, the processor downloads the new content and causes the display interface to present a pop-up alert based on the new content.

According to an embodiment of the present invention, there is provided a method of a reception apparatus for providing an alert service. The method includes receiving a notification of the alert service and presenting the notification of the alert service on a display. Further, a request to subscribe to the alert service is received from a user. A location of new content information associated with the alert service is registered in a memory in response to receiving the request to subscribe to the alert service. Subsequently, the reception apparatus determines whether new content corresponding to the alert service is available based on the new content information. When the new content is determined to be available, the new content is downloaded and a pop-up alert based on the new content is presented.

Further, according to an embodiment of the present invention, there is provided a computer-readable storage medium having instructions embedded therein, which, when executed by a computer, cause the computer to perform the method of the reception apparatus, as discussed above.

According to an embodiment of the present invention, there is provided an information providing apparatus, which includes a memory and a communication unit. The memory is configured to store a triggered declarative object (TDO) that includes a notification of an alert service. Further, the communication unit is configured to provide the TDO to a reception apparatus. The TDO is associated with content to be received by the reception apparatus, and includes a location of new content information associated with the alert service, or a location of a website that offers a subscription to the alert service and includes the location of the new content information. The new content information indicates whether new content corresponding to the alert service is available.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
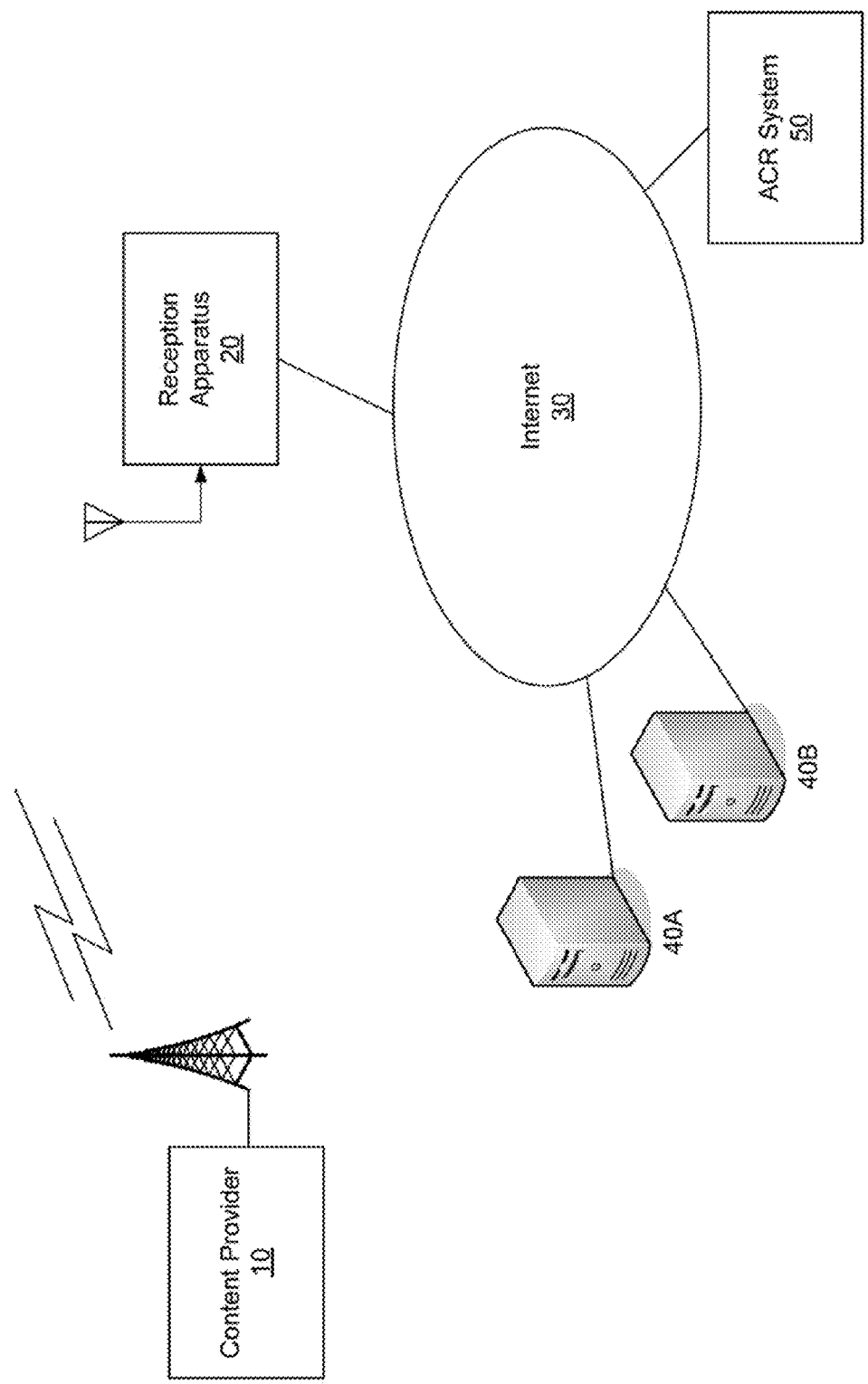
FIG. 1 illustrates an exemplary broadcast system including a content provider, reception apparatus, and service providing servers.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

Referring now to the drawings, FIG. 1 is a block diagram that shows an exemplary broadcast system 2, including a content provider 10, a reception apparatus 20, and service providing servers 40A and 40B. The reception apparatus 20 accesses the service providing servers 40A and 40B via a communication network such as the Internet 30.

In one embodiment, the broadcast system 2 provides an interactive television feature whereby a viewer is given the opportunity to subscribe to a service that offers one or more occasional alert messages that are displayed to the viewer. In one embodiment, a pop-up alert would appear regardless of what television channel a user of the reception apparatus 20 is currently tuned to. In another embodiment, the pop-up alert would appear regardless of what source, menu, and/or application is being displayed. The reception apparatus 20 may also be programmed to display the pop-alert while operating in a stand-by mode such that a display is powered on to display the pop-up alert. Alternatively, only pop-up alerts associated with, or otherwise permitted by, the content provider of the currently tuned television channel are processed and/or displayed. For example, when a user is viewing content from CSPAN, the reception apparatus 20 may only process and/or display pop-up alerts associated with, or provided by, CSPAN.

The type and content of the pop-up alert would depend on what alert service(s) have been subscribed to by the user. Further, the pop-up alert may be in the form of a window containing text and/or graphics, an icon, or the like.

Each subscription-based alert service is associated with content that may be of interest to the user and may be based on one or a combination of content of a predetermined type, personal demographic information (e.g., geographic location), user preferences and interests, a keyword(s) designated by the user, etc. An exemplary usage of a subscription-based alert service includes CSPAN offering a subscription to a service that will alert the user whenever there is a live hearing involving the FCC. Another example is a local broadcaster offering a subscription to a service that will alert the user whenever there is a severe weather warning in a local area. A further example is a local broadcaster offering a subscription to a service that alerts the viewer when the nightly news broadcast is scheduled to include a story on a given topic chosen by the user.

To provide the subscription-based alert service, the broadcast system 2 implements a standardized method to allow a user (e.g., a television viewer) to "subscribe" to certain types of alert messages. In this context, the term "subscribe" refers to the user's choice to receive the pop-up notifications, and may or may not involve a monetary transaction, registration process, or purchase. In one embodiment, a service provider offers these alert services via a presence on the Internet, and serves them to appropriate television viewers. Although, the service provider is typically associated with a content provider 10, such an association is not required. For example, an alert service may be associated with, or provided by, an advertiser or television program.

The user subscribes to an alert service by opting-in to the alert service. As described in further detail below, the user opts in to the alert service via a software object, such as a Triggered Declarative Object (TDO) received by the reception apparatus 20, or by visiting a service provider's website.

The TDO is a downloadable software object created by a content provider, content creator, or service provider, which includes declarative content (e.g., text, graphics, descriptive markup, scripts, and/or audio) whose function is tied in some way to the content it accompanies. An embodiment of the TDO is described in U.S. application Ser. No. 12/959,529 filed Dec. 3, 2010 entitled "Announcement of Triggered Declarative Objects" to Blanchard et al. which is hereby incorporated by reference in its entirety. However, the TDO is not limited to the structure described in Blanchard et al. since many attributes defined therein as being a part of a TDO could be situated in a trigger or vice versa or not present at all depending upon the function and triggering of a particular TDO.

The TDO is generally considered as "declarative" content to distinguish it from "executable" content such as a Java applet or an application that runs on an operating system platform. Although the TDO is usually considered to be a declarative object, a TDO player supports a scripting language that is an object-oriented programming language. The TDOs, in examples shown herein, are received from a content or service provider in advance of the time they are executed, as discussed below, so that the TDO is available when needed. Moreover, an explicit trigger signal may not be necessary and a TDO may be self-triggering or triggered by some action other than receipt of a trigger signal. Various standards bodies may define associated behaviors, appearances, trigger actions, and transport methods for content and metadata for a TDO. Additionally, requirements regarding timing accuracy of TDO behaviors relative to audio/video may be defined by standards bodies.

Other methods for subscribing to an alert service include using an EPG or accessing the website using a separate computing device such as a desktop computer, laptop computer, tablet computer, handheld device (e.g., a smartphone), or the like. When a subscription is made to an alert service using a separate computing device, the reception apparatus 20 is notified of the subscription by either the website or separate computing device.

The content provider 10 may provide content to the reception apparatus 20 via a terrestrial broadcast. In other embodiments, the content provider 10 provides the content via at least one of a satellite broadcast, a cable television transmission, a terrestrial television broadcast, cellular network, and data communication network such as a local area network (LAN), wide area network (WAN), or the Internet 30. The content provided by the content provider 10 includes one or more television programs, without regard to whether the content is a movie, sporting event, segment of a multipart series, news broadcast, etc. Further, the content provided by the content provider 10 may also include advertisements, infomercials, and other program-like content which may not be reported as a program in an EPG.

In one embodiment, the content provider 10 provides one or more alert services to which a user of the reception apparatus 20 can subscribe. The alert services offer occasional alert messages that appear on-screen for display to the user of the reception apparatus 20. The service providing servers 40A and/or 40B store information related to the one or more alert services. In one embodiment, the service providing server 40A stores information on new content associated with the one or more service alerts, and the service providing server 40B stores the new content suitable for display to the user such as a Declarative Object (DO). In another embodiment, one of the service providing servers 40A and 40B stores a website that provides the user of the reception apparatus 20 with the opportunity to subscribe to the one or more alert services provided by the content provider 10. It should be noted that one or any other combination of servers may be used to provide the information related to one or more service alerts and/or the new content.

Figure 3:
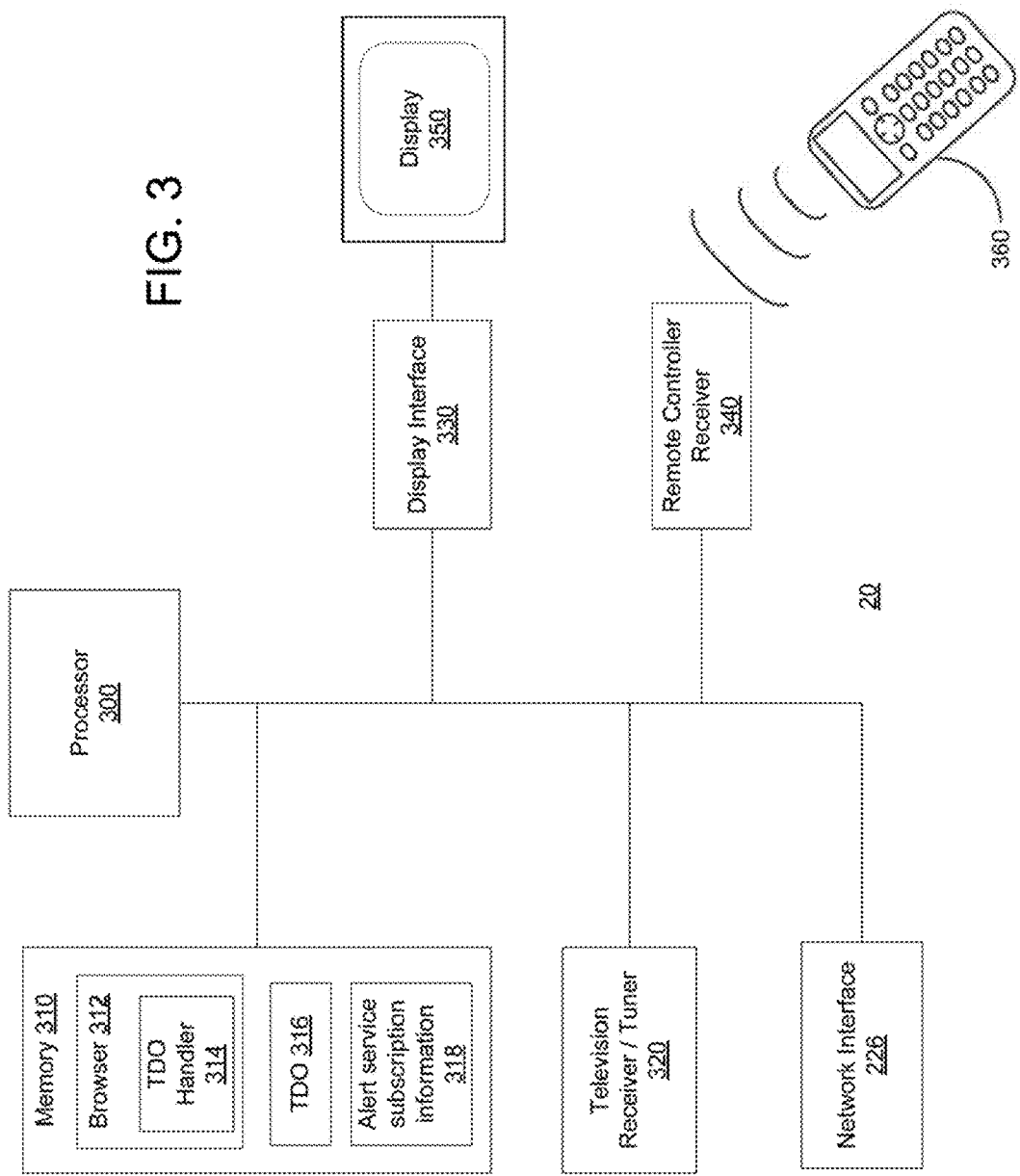
FIG. 3 is a processor-centric block diagram of an exemplary reception apparatus.

The reception apparatus 20 receives the content provided by the content provider 10 and displays the content on a display 350, illustrated in FIG. 3. In one embodiment, the display is an integral part of the reception apparatus 20 such as a television set. Alternatively, the display may be external to the reception apparatus 20 such as a television set connected to a set top box. The reception apparatus 20 supports the subscription based alert service by monitoring information stored on one or more of the service providing servers 40A and 40B to determine whether new content that is associated with a subscribed to alert service is available. The information stored on the service providing servers 40A or 40B may be pushed to, or pulled (e.g., polling) by, the reception apparatus 20.

In one embodiment, when a user subscribes to an alert service for news stories of a particular topic, the reception apparatus 20 supports the subscription to the alert service by polling the service provider server 40A and/or 40B to see if there are any new stories. If a new item is found, a DO is retrieved and executed. The execution of the DO results in relevant text/graphics being rendered to display an associated pop-up alert to the user. The DO can be specified in a standard to use the same protocols as the TDOs used for regular interactive television. Thus, in one embodiment, the alert DOs can offer the same set of capabilities as a regular TDO.

Figure 2:
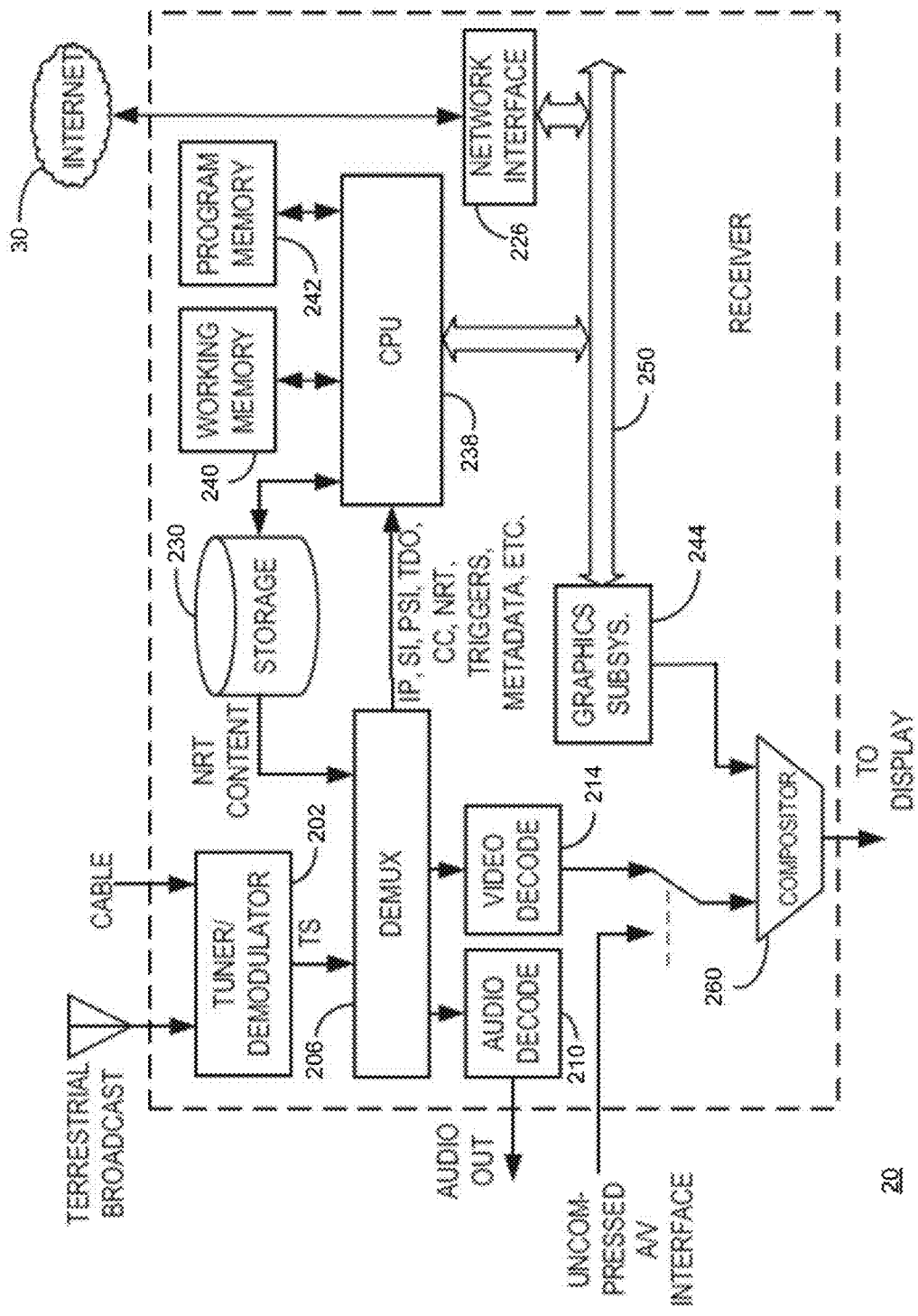
FIG. 2 is a block diagram of an exemplary reception apparatus.

FIG. 2 illustrates an embodiment of the reception apparatus 20. The reception apparatus 20 is a digital television receiver device that may be incorporated into a television set or a set top box. The reception apparatus 20 includes a tuner/demodulator 202, which receives content from one or more content sources such as a terrestrial broadcast or a cable television transmission. The reception apparatus 20 may also receive content from a satellite broadcast. The tuner/demodulator 202 receives a transport stream (TS), which is demultiplexed by the demultiplexer 206 into audio and video (A/V) streams. The audio is decoded by an audio decoder 210 and the video is decoded by a video decoder 214. Further, uncompressed A/V data may be received via an uncompressed A/V interface that can be selectively utilized.

In one embodiment, the TS includes ancillary information such as one or more of caption data, TDOs, triggers, etc. However, in other embodiments, the A/V content and/or the ancillary information may be received via the Internet 30 and a network interface 226.

A storage unit 230 is provided to store non-real time (NRT) or Internet-delivered content such as Internet Protocol Television (IPTV). The stored content can be played by demultiplexing the content stored in the storage 230 by the demultiplexer 206 in a manner similar to that of other sources of content. The storage unit 230 may also store information on any alert services subscribed to by a user of the reception apparatus 20.

The reception apparatus 20 generally operates under control of at least one processor, such as CPU 238, which is coupled to a working memory 240, program memory 242, and a graphics subsystem 244 via one or more buses (e.g., bus 250). The CPU 238 receives closed caption data from the demultiplexer 206 as well as any other information such as TDO announcements and EPGs used for rendering graphics, and passes the information to the graphics subsystem 244. The graphics outputted by the graphics subsystem 244 are combined with video images by the compositor and video interface 260 to produce an output suitable for display on a video display.

Further, the CPU 238 operates to carry out functions of the reception apparatus 20 including the processing of related triggers, TDOs, alert services, and browser operations. The processing related to alert services includes notification of the availability of an alert service, subscribing to the alert service, monitoring for new content associated with the alert service, presenting a pop-up alert corresponding to the new content, performing one or more actions (e.g., channel change or schedule a recording) associated with the pop-up alert, etc. The browser operations include accessing a service specified by a URL given by the TDO or trigger. The CPU 238 further operates to execute script objects (control objects) contained in the TDO, its trigger(s), the new content related to the alert service (e.g., a DO), etc.

Although not illustrated in FIG. 2, the CPU 238 may be coupled to any one or a combination of the television resources to centralize control of one or more functions of the reception apparatus 20. In one embodiment, the CPU 238 also operates to oversee control of the reception apparatus 20 including the tuner/demodulator 202 and other television resources.

A more processor-centric view of the reception apparatus 20 is illustrated in FIG. 3. Memory and storage 230, 240, and 242 are depicted collectively as memory 310. Similarly, the various demodulators, decoders, etc., that initially process digital television signals are collectively depicted as television receiver/tuner 320. The reception apparatus 20 further includes a remote controller 360 which communicates with a remote controller receiver interface 340. Additionally, the display 350 is either a display integral to the reception apparatus 20 as in a television set or a connected display device as in the case where the reception apparatus 20 is integrated into a set-top box.

Memory 310 contains various functional program modules and data. The memory 310 stores the data used by the reception apparatus 20. The memory 310 within the reception apparatus 20 can be implemented using disc storage form as well as other forms of storage such as non-transitory storage devices including for example network memory devices, magnetic storage elements, magneto-optical storage elements, flash memory, core memory and/or other non-volatile storage technologies. When a TDO 316 is received, the TDO 316 is stored in the memory 310. The TDO storage and execution is carried out by a TDO handler 314, which may be integral to a browser 312. The TDO, when executed may present an announcement or notification, generally defined within the TDO, to the viewer which permits the viewer to subscribe to one or more alert services via selection of a control object (e.g., by use of the remote controller 360). The memory 310 also stores alert service subscription information 318, which in one embodiment identifies the location of information related to one or more subscribed alert services. In one embodiment, the location identifies an address of information identifying the availability of new content related to one or more of the alert services. The processor 300 refers to the alert service subscription information 318 to monitor for new content related to the subscribed to alert services.

Figure 4:
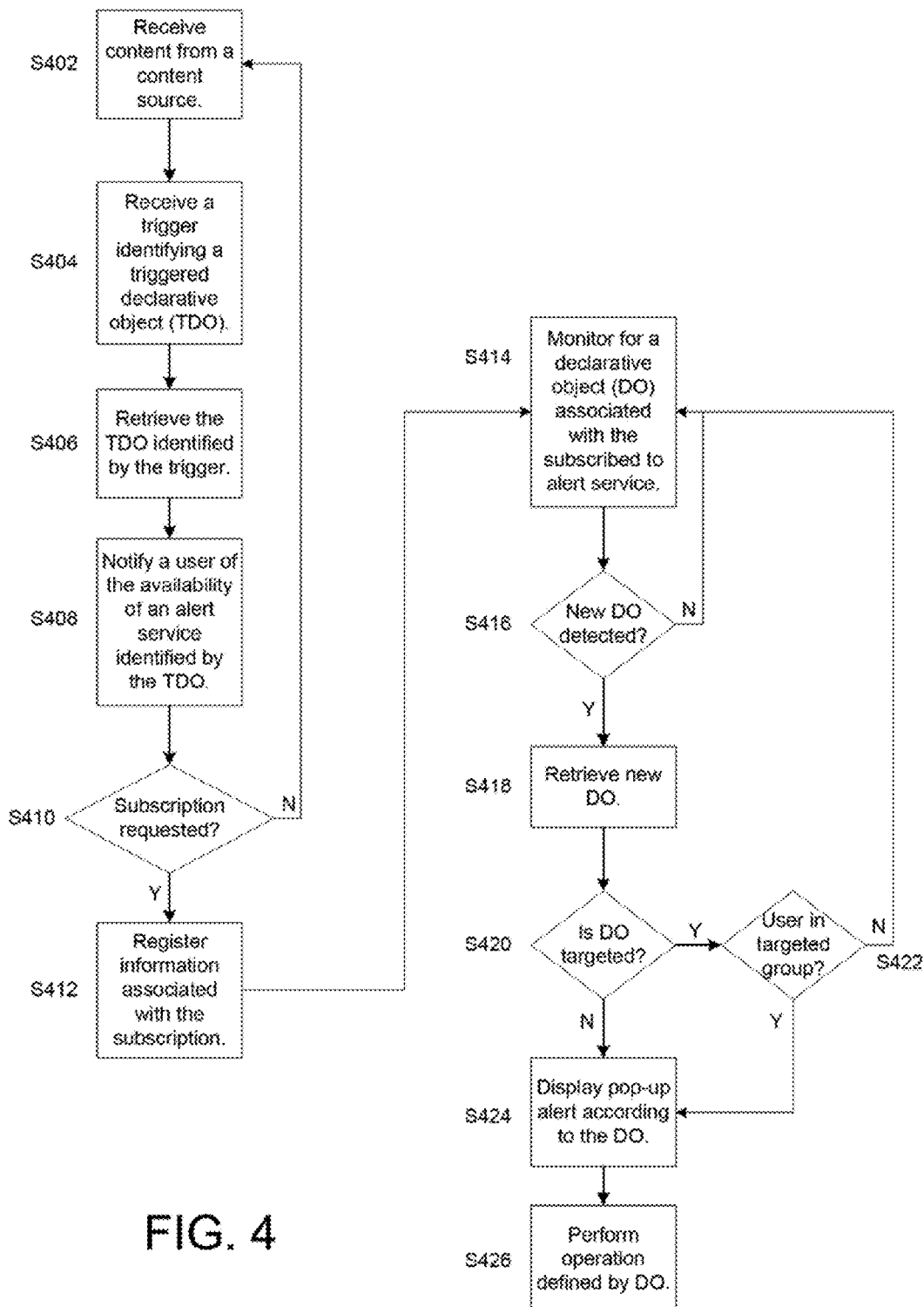
FIG. 4 illustrates a flow diagram of an exemplary process for providing an alert service.

FIG. 4 provides an overview of an exemplary process for providing an alert service to a user of the reception apparatus 20. In step S402, the reception apparatus 20 receives content (e.g., a television program) from a content source, such as the content provider 10. The received content is presented to the user of the reception apparatus 20. In step S404, a trigger identifying a TDO is received by the reception apparatus 20.

The trigger is a data object, which is optionally bound to a particular item of programming content that references a specific TDO instance, by the use of a file name or identifier for an object that has already been downloaded. Certain TDOs will only make sense in conjunction with a certain program. An example is a TDO that collects viewer response data, such as voting on a game show or contest.

In one embodiment, the trigger is carried in a TS associated with the content provided by the content provider 10. The trigger causes the reception apparatus 20 to retrieve the TDO identified by the trigger in step S406. The TDO may be acquired from the TS or from other sources such as the Internet. Further, in one embodiment, when the trigger is not available via the TS, the reception apparatus 20 acquires the trigger via an automatic content recognition (ACR) system 50 by, for example, sending A/V samples of the content received in step S402 to the ACR system 50 illustrated in FIG. 1.

Figure 6A:
FIGS. 6A and 6B illustrate exemplary notifications regarding available alert services.
Figure 6B:
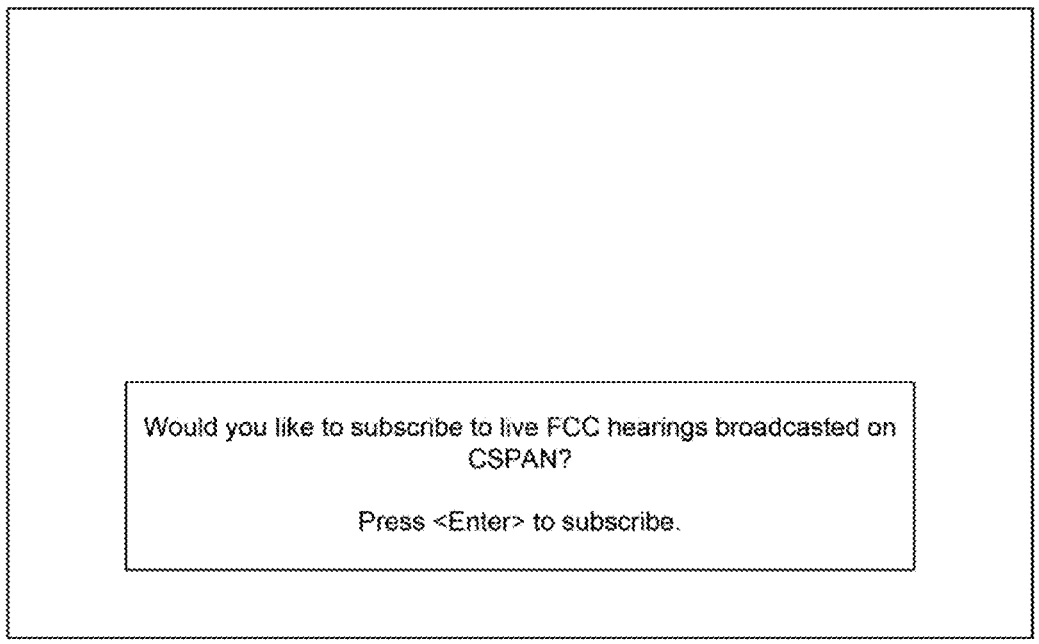

After the TDO is retrieved by the reception apparatus 20, the TDO is executed and a notification of an alert service identified by the TDO is displayed to the user of the reception apparatus 20, as illustrated in FIGS. 6A and 6B for example, in step S408. In step S410, the reception apparatus 20 determines whether a subscription request is received from the user of the reception apparatus 20. When a subscription is not requested, the process returns to step S402 at which time the reception apparatus 20 continues to receive the content from the content source and awaits receipt of the next trigger associated with a TDO.

When a subscription to the displayed alert service is requested by the user, the process proceeds to step S412, at which time information associated with the service alert is registered in the reception apparatus 20. In one embodiment, the registration includes storing the location of new content information associated with the alert service in memory. The new content information is monitored by the reception apparatus 20 to determine whether new content associated with an alert service is available. The new content information identifies the location of the new content, or the existence of new content, to be retrieved by the reception apparatus 20. The new content information may be obtained via the Internet or transmitted with content received by the reception apparatus 20 in a TS or a broadcast carousel. For example, the new content information could be delivered over a terrestrial broadcast as a file in the non-real-time (NRT) content using a File Delivery over Unidirectional Transport (FLUTE). In another embodiment, the user may create custom alerts by selecting one or more keywords, which would be included as part of the registered information associated with the service alert.

In one embodiment, the Really Simple Syndication (RSS) concept or the Atom syndication format specified in RFC 5023 is repurposed for use in an interactive digital television system. The RSS-like feed would correspond to the new content information and would typically be obtained via the Internet since cable/satellite operators do not always provide connected devices such as Internet-enabled TVs access to the TS. However, depending on the frequency of RSS updates, the use of a RSS-like feed may not be suitable for time-sensitive announcements.

In regular RSS, which is typically used with news reader applications or web browsers, the user can see a list of titles of new items whenever he or she reviews the list of RSS feeds. Intelligence in the browser keeps the contents of the list current by retrieving a corresponding RSS description file in the background. The RSS description file may be retrieved periodically. In the interactive digital television application, the platform would also periodically retrieve any new items from the subscribed services. Retrieval of the new items may also be performed at the occurrence of a predetermined event or according to any other criteria designated by the service provider or user. In the interactive digital television case, if any new items are available, they would be downloaded and executed (played). The download and/or execution may be performed immediately or based on other predetermined criteria.

After registration of the information associated with the subscription in step S412, the reception apparatus 20 monitors the new content information to determine whether new content associated with the subscribed to alert service is available. When the new content is determined to be available, the reception apparatus 20 retrieves the new content based on the new content information.

In one embodiment, the new content is a DO that causes the reception apparatus 20 to display a pop-up alert. Further, the DO is restricted to the display of text and/or graphics, without the capability to request information such as personal demographic information from the user. The DO may also be configured to include associated actions such as providing the user an option to tune to an associated channel or to schedule recording of associated content.

Further, the DO may be targeted to users of one or more particular groups. When the DO is executed by the reception apparatus 20, a determination is made as to whether the DO is a targeted DO, in step S420. When the DO is not targeted, the reception apparatus 20 proceeds to step S424, at which time a pop-up alert is displayed according to the DO.

When the DO is targeted, the process proceeds to step S422, at which time a determination is made as to whether the user of the reception apparatus 20 is part of the targeted group. In one embodiment, this determination is made by the DO, which accesses profiles, demographics, and interests (PDI) information stored in a memory of the reception apparatus 20, such as memory 310. The information may include demographic information such as one or more of gender, age, zip code, or household income, or personalized information such as interests, and the like. If the DO determines that the user of the reception apparatus 20 is part of the targeted group, the process proceeds to step S424 and the pop-up alert is displayed according to the DO. If the user is not part of the targeted group, the process returns to step S414 at which time the reception apparatus 20 continues to monitor for new content (e.g., a new DO) associated with the subscribed to alert service.

Figure 5:
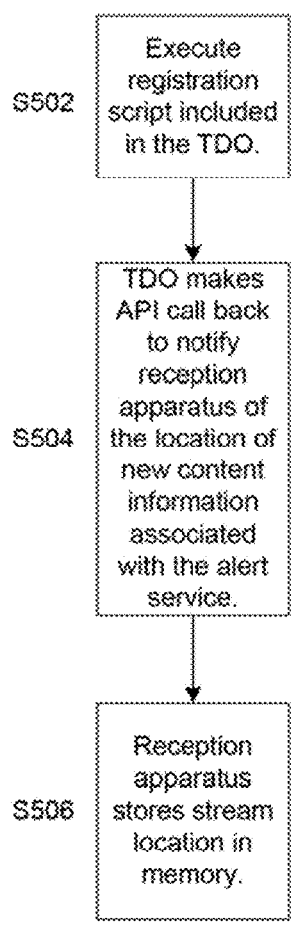
FIG. 5 illustrates a more detailed flow diagram of an exemplary process for registering information associated with an alert service subscription.

FIG. 5 is a more detailed illustration of registration process performed in step S412 according to one embodiment. As illustrated in FIG. 5, the registration process begins at step S502 at which time a registration script included in the TDO is executed. In step S504, the registration script causes the TDO to make an application programming interface (API) call back to notify the reception apparatus 20 of the location of the new content information associated with the alert service. In step S506, the reception apparatus 20 stores the location of the new content information associated with the alert service in a memory, such as memory 310.

FIGS. 6A and 6B illustrate examples of TDO notifications presented to a user of the reception apparatus 20 regarding available alert services. In FIG. 6A, the notification relates to a local broadcaster's offering of a subscription to a service that will alert the user whenever there is a severe weather warning for a local area. Accordingly, for example, a viewer on the west side of Lake Michigan would not see pop-up alerts designed for viewers residing on the east side of the lake. In FIG. 6B, the notification relates to an offering from CSPAN for a subscription that will alert the user whenever there is a live hearing involving the FCC.

In one embodiment, the notifications are associated with the content currently being viewed by the user. For example, in the case of a severe weather alert service, the notification may be presented to the user when the user is currently viewing a severe weather report on the local news or a related advertisement. However, the notifications need not be associated with the currently viewed programming.

Figure 7:
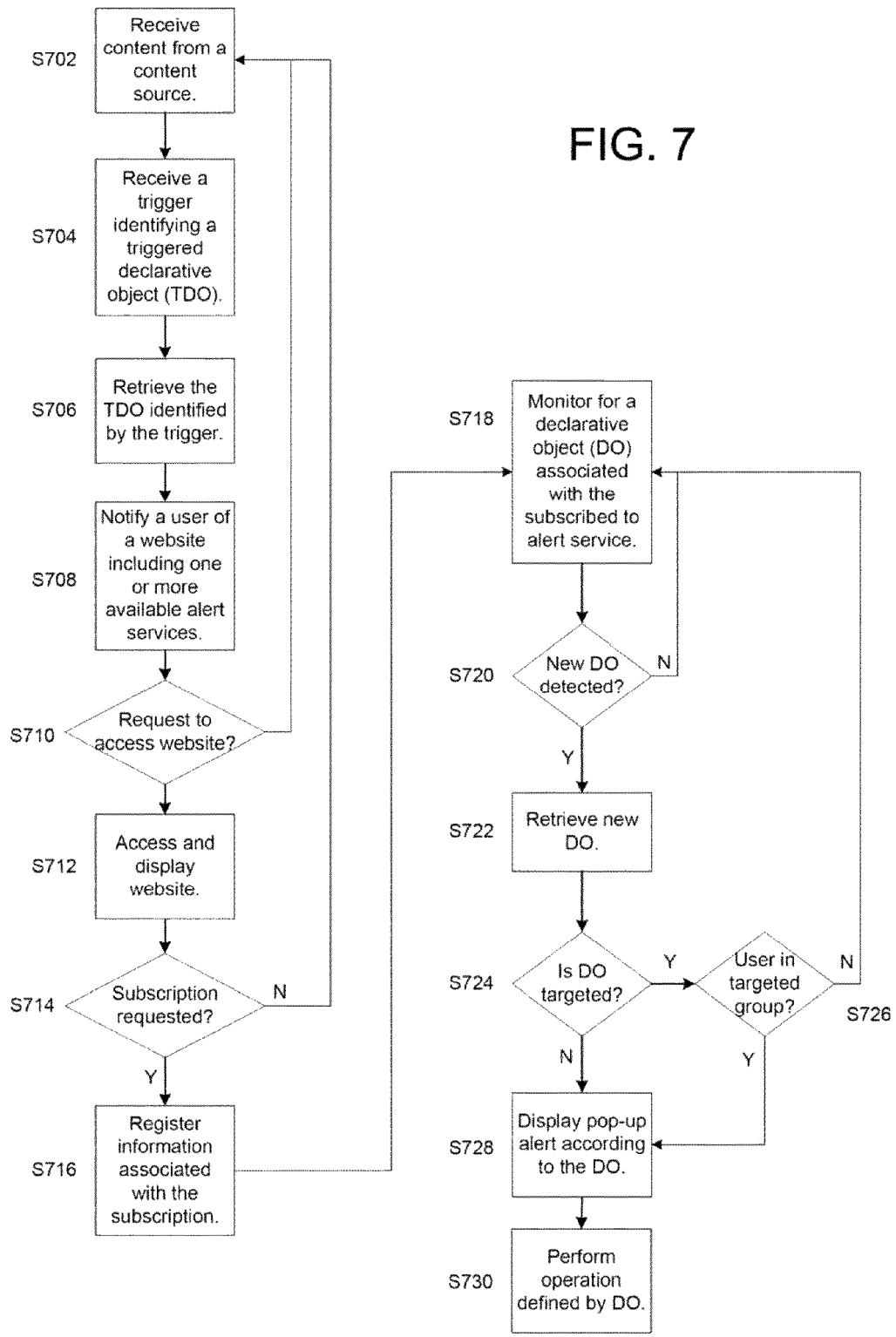
FIG. 7 illustrates a flow diagram of another exemplary process for providing an alert service.

FIG. 7 provides an overview of another exemplary process for providing an alert service to a user of the reception apparatus 20. Similar to the embodiment discussed with respect to FIG. 4, in step S702, the reception apparatus 20 receives content from a content source, such as the content provider 10. The received content is presented to the user of the reception apparatus 20. In step S704, a trigger identifying a triggered declarative object (TDO) is received by the reception apparatus 20. The trigger causes the reception apparatus 20 to retrieve the TDO identified by the trigger in step S706. The TDO may be acquired from the TS or from other sources such as the Internet.

Figure 8:
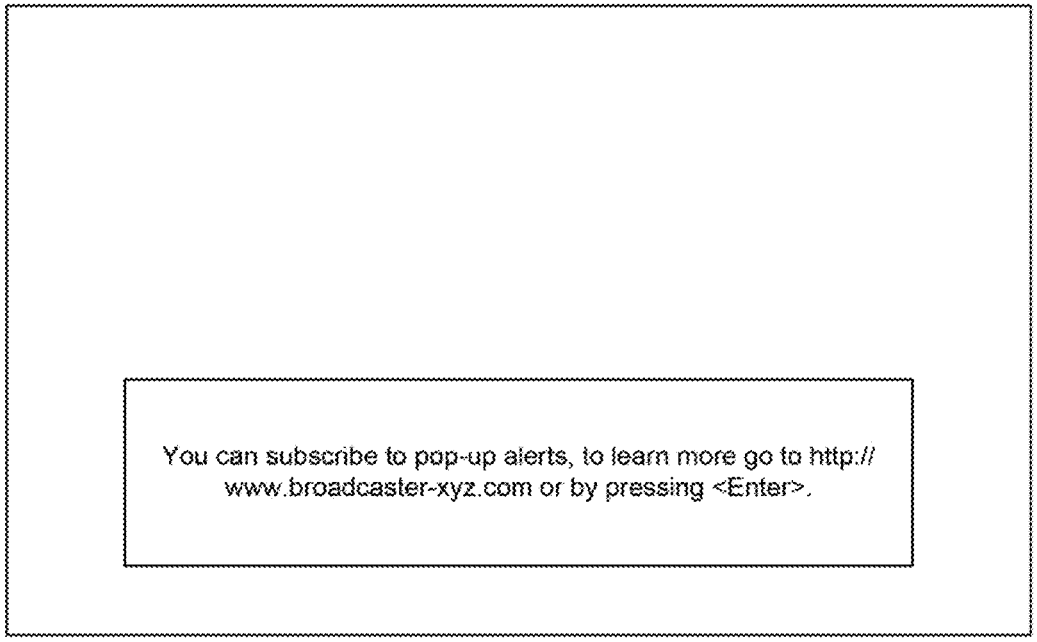
FIG. 8 illustrates an exemplary notification regarding a website that offers a subscription to an alert service.

The process illustrated in FIG. 7 differs from the process of FIG. 4 with respect to the manner in which the available one or more alert services are presented to the user of the reception apparatus 20. Specifically, in step S708, the user is notified of a website that includes one or more alert services. An exemplary notification that is presented to the user is illustrated in FIG. 8. In step S710, the reception apparatus 20 determines whether a request to access the website is received from the user. When access to the website is not requested, the process returns to step S702 at which time the reception apparatus 20 continues to receive the content from the content source and awaits receipt of the next trigger associated with a TDO.

In one embodiment, when the user does not wish to access the website at the current time, the user is given the option to save the location of the website for access at a later time. Bookmarking the website would be useful when, for example, the user is interested in subscribing to an alert service but does not want to miss a portion of the currently received content.

Figure 9A:
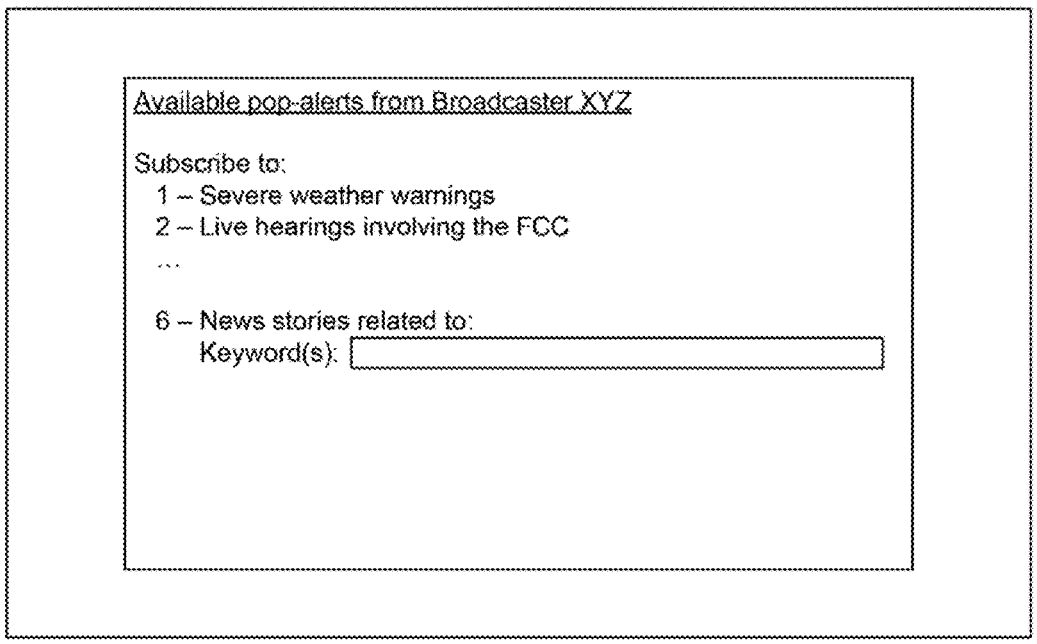
FIGS. 9A-9C illustrate exemplary displays associated with accessing and displaying a website for subscribing to one or more alert services.
Figure 9B:
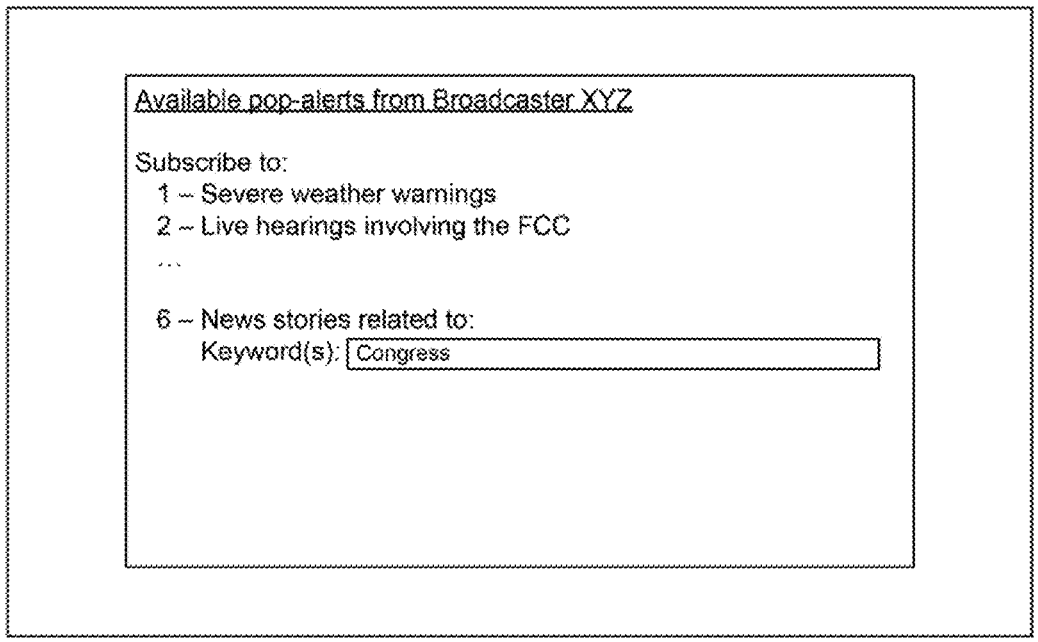
Figure 9C:
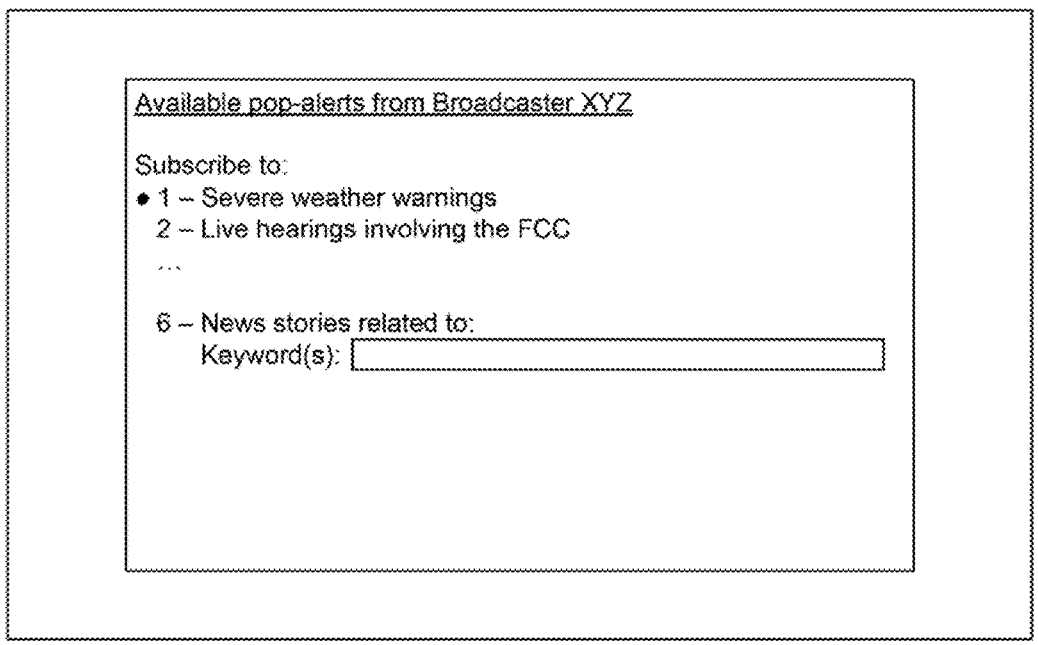
Figure 10A:
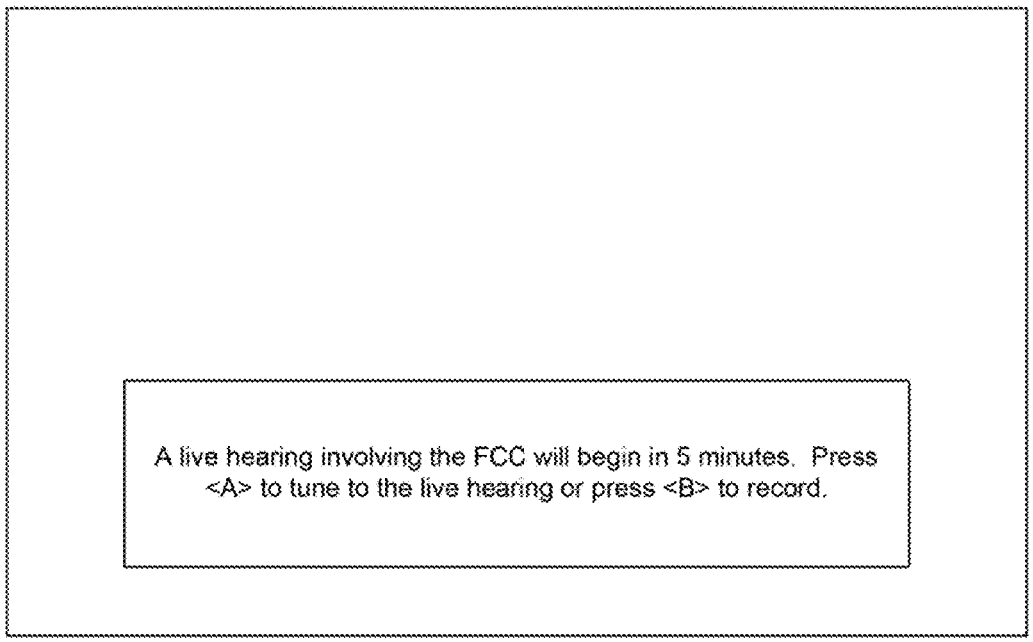
FIGS. 10A and 10B illustrate exemplary pop-up alerts associated with registered alert service subscriptions and presented to a user.
Figure 10B:
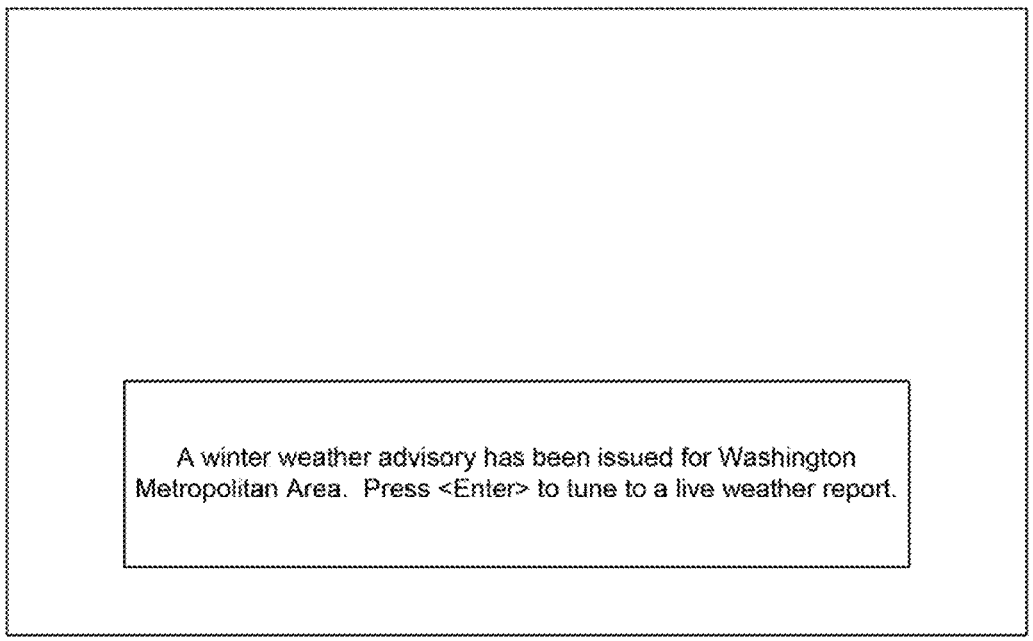

When a request to access the website is received by the reception apparatus 20, the website is accessed and displayed by the reception apparatus 20 in step S712. The website displayed to the user includes one or more alert services available for subscription by the user. FIGS. 9A-9C illustrate an exemplary website that may be accessed by the user. As illustrated in FIG. 9A, the website may include a plurality of alert services. The user subscribes to the alert services by selecting one or more of the alert services, for example, by clicking on a link associated with the one or more alert services. Further, the user has the option to customize an alert by entering one or more keywords, as illustrated in FIG. 9B. In one embodiment, upon selecting one of the alert services, an indication that the alert service has been subscribed to is displayed, such as by displaying a bullet point, "●" or check-mark.

The user selection of an alert service causes the reception apparatus 20 to register information associated with the alert service in step S716. In one embodiment, a script is run while the user interacts with the website to notify the reception apparatus 20 of the location of new content information to be monitored by the reception apparatus 20 to determine whether new content associated with the alert service is available.

Steps S718, S720, S722, S724, S726, S728, and S730 are performed in a similar manner as discussed above with respect to steps S414, S416, S418, S420, S422, S424, and S426 in FIG. 4.

As noted above, a user of a reception apparatus 20 is given the opportunity to subscribe to one or more alert services. When a plurality of alert services are registered in the reception apparatus 20, the reception apparatus may be configured to only process one or more alert services associated with content provider providing the content being received and presented by the reception apparatus 20. That is, the reception apparatus 20 would only monitor the new content information, or display the new content, corresponding to those one or more alert services. In another embodiment, the reception apparatus 20 monitors the new content information, or display the new content, corresponding to those one or more alert services regardless of the content provider providing the content being received and presented by the reception apparatus 20. Further, when multiple pop-up alerts occur at the same or overlapping times, the multiple pop-up alerts may be displayed one at a time or simultaneously.

Further, upon requesting a subscription to the one or more alert services, the subscription is registered in the reception apparatus 20. Should the user determine that he/she no longer wishes to receive an alert service, the user may be given the opportunity to delete, or temporarily disable, the alert service using, for example, an on-screen menu. In one embodiment, the reception apparatus 20 includes a local channel-specific opt-in/opt-out function. This channel-specific function would be accessible after an initial registration of the subscription to the alert service associated with the respective channel. Alternatively, the pop-up alert itself may provide the user with the option to unsubscribe from the respective alert service. Further, the user may be given the option to disable or enable a subset or all alert services when viewing particular content, such as content presented on a particular channel.

Figure 11:
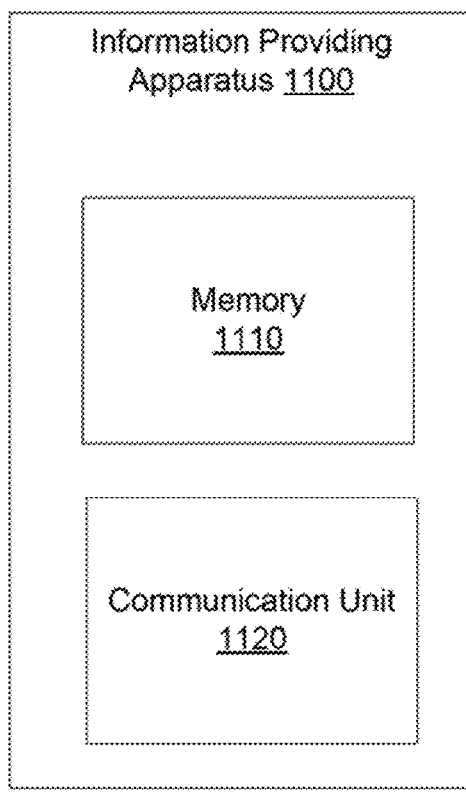
FIG. 11 is a block diagram of an exemplary information providing apparatus.

FIG. 11 illustrates an information providing apparatus 1100, which may be included in the content provider 10, the ACR system 50, or a stand-alone device. As illustrated in FIG. 11, the information providing apparatus 1100 includes a memory 1110 and a communication unit 1120. The memory 1110 can be implemented using disc storage form as well as other forms of storage such as non-transitory storage devices including for example network memory devices, magnetic storage elements, magneto-optical storage elements, flash memory, core memory and/or other non-volatile storage technologies. Further, the communication unit 1120 can be implemented using any one or a combination of a terrestrial broadcast transmitter, a cable broadcast transmitter, a satellite uplink transmitter, a network interface (e.g., WLAN card, Ethernet card, etc.), or the like.

The memory 1110 is configured to store a TDO, which includes a notification of an alert service and is associated with content provided from a content source, such as the content provider 10. The communication unit 1120 provides the TDO stored in the memory 1110 to the reception apparatus 20. For example, the communication unit 1120 provides the TDO to the reception apparatus 20 via the TS or the Internet. As noted above, the TDO includes a location of new content information associated with the alert service, or a location of a website that offers a subscription to the alert service and includes the location of the new content information, as discussed above with respect to FIGS. 4 and 7, respectively. After a subscription to the notification alert service is registered in the reception apparatus 20, the reception apparatus 20 monitors the new content information to determine whether new content corresponding to the alert service is available.

The various processes discussed above need not be processed chronologically in the sequence depicted as flowcharts; the steps may also include those processed parallelly or individually (e.g., in paralleled or object-oriented fashion).

Also, the programs may be processed by a single computer or by a plurality of computers on a distributed basis. The programs may also be transferred to a remote computer or computers for execution.

Furthermore, in this specification, the term "system" means an aggregate of a plurality of component elements (apparatuses, modules (parts), etc.). All component elements may or may not be housed in a single enclosure. Therefore, a plurality of apparatuses each housed in a separate enclosure and connected via a network are considered a network, and a single apparatus formed by a plurality of modules housed in a single enclosure are also regarded as a system.

Also, it should be understood that this technology when embodied is not limited to the above-described embodiments and that various modifications, variations and alternatives may be made of this technology so far as they are within the spirit and scope thereof.

For example, this technology may be structured for cloud computing whereby a single function is shared and processed in collaboration among a plurality of apparatuses via a network.

Also, each of the steps explained in reference to the above-described flowcharts may be executed not only by a single apparatus but also by a plurality of apparatuses in a shared manner.

Furthermore, if one step includes a plurality of processes, these processes included in the step may be performed not only by a single apparatus but also by a plurality of apparatuses in a shared manner.

Numerous modifications and variations of the present invention are possible in light of the above teachings. It is therefore to be understood that within the scope of the appended claims, the invention may be practiced otherwise than as specifically described herein.

The invention claimed is:

1. A reception apparatus, comprising:
a memory; and
circuitry configured to:
receive, without request from a user, a notification of availability to subscribe to an alert service;
provide the notification of availability to subscribe to the alert service for output on a display;
receive a request, from the user in response to the notification being output on the display, to subscribe to the alert service;
register a data source as a registered data source in the memory in response to receiving the request to subscribe to the alert service, the data source being a server or a broadcast signal that provides new content information for the alert service;
monitor the new content information from the registered data source;
determine whether new content, corresponding to the alert service, is available from the registered data source based on the new content information;
determine whether the new content is targeted to users of one or more groups;
determine, if the new content is determined to be targeted to the users of the one or more groups, whether the user is included in the users of the one or more groups based on profiles, demographics, and interests (PDI) information stored in the memory;
control, if the user is determined to be included in the users of the one or more groups, the display to present a pop-up alert based on the new content; and
control, if the new content is determined not to be targeted to the users of the one or more groups, the display to present the pop-up alert based on the new content.

2. The reception apparatus according to claim 1, wherein the circuitry is configured to:
receive an application that includes the notification of availability to subscribe to the alert service;
execute the application; and
present the notification of availability to subscribe to the alert service.

3. The reception apparatus according to claim 2, wherein the application identifies the data source of the new content information associated with the alert service.

4. The reception apparatus according to claim 2, wherein the circuitry is configured to:
access a website that offers a subscription to the alert service based on the website identified by the application;
acquire an identification of the data source from the website; and
receive the request from the user to subscribe to the alert service based on an interaction with the website.

5. The reception apparatus according to claim 1, wherein the new content is another application, and
the circuitry is configured to execute the other application to present the pop-up alert.

6. The reception apparatus according to claim 5, wherein the circuitry is configured to suspend a running application before the execution of the other application.

7. The reception apparatus according to claim 5, wherein the other application includes a scripted control object configured to tune to, or record, a channel associated with the new content.

8. The reception apparatus according to claim 1, wherein the circuitry is configured to:
receive content from a content provider; and
concurrently display the pop-up alert and the received content.

9. The reception apparatus according to claim 1, wherein the circuitry is configured to:
register a plurality of alert services of a plurality of different content providers in the memory; and
only process one or more of the plurality of alert services associated with the content providers.

10. The reception apparatus according to claim 8, wherein the circuitry is configured to:
receive the content via at least one of a satellite broadcast, a cable television transmission, a terrestrial television broadcast, and a network; and
receive the new content information associated with the alert service via the network.

11. A method of a reception apparatus for providing an alert service, the reception apparatus including a memory and circuitry, the method comprising:
receiving, without request from a user, a notification of availability to subscribe to the alert service;
providing the notification of availability to subscribe to the alert service for output on a display;

receiving a request, from the user in response to the notification being output on the display, to subscribe to the alert service;
registering, by the circuitry, a data source as a registered data source in the memory in response to receiving the request to subscribe to the alert service, the data source being a server or a broadcast signal that provides new content information for the alert service;
monitoring, by the circuitry, the new content information from the registered data source;
determining, by the circuitry, whether new content, corresponding to the alert service, is available from the registered data source based on the new content information;
determining whether the new content is targeted to users of one or more groups;
determining, if the new content is determined to be targeted to the users of the one or more groups, whether the user is included in the users of the one or more groups based on profiles, demographics, and interests (PDI) information stored in the memory;
controlling, if the user is determined to be included in the users of the one or more groups, the display to present a pop-up alert based on the new content; and
controlling, if the new content is determined not to be targeted to the users of the one or more groups, the display to present the pop-up alert based on the new content.

12. The method according to claim 11, wherein
said receiving the notification of availability to subscribe to the alert service includes receiving an application that includes the notification of availability to subscribe to the alert service, and
said providing the notification of availability to subscribe to the alert service includes presenting the notification of availability to subscribe to the alert service when the received application is executed.

13. The method according to claim 12, wherein the application identifies the data source of the new content information associated with the alert service.

14. The method according to claim 12, further comprising:
accessing a website that offers a subscription to the alert service based on the website identified by the application; and
acquiring an identification of the data source from the website, wherein
said receiving the request includes receiving the request from the user to subscribe to the alert service based on an interaction with the website.

15. The method according to claim 11, wherein
the new content is another application, and
said presenting the pop-up alert includes executing the other application.

16. The method according to claim 15, further comprising:
suspending a running application before the execution of the other application.

17. The method according to claim 15, wherein the other application includes a scripted control object configured to tune to, or record, a channel associated with the new content.

18. The method according to claim 11, further comprising:
receiving content from a content provider, wherein
said presenting the pop-up alert includes concurrently presenting the received content and the pop-up alert on the display.

19. The method according to claim 11, wherein
the memory stores a plurality of alert services of a plurality of different content providers, and
said determining the availability of the new content includes determining the availability of the new content corresponding to one or more of the plurality of alert services.

20. The method according to claim 18, wherein
said receiving the content includes receiving the content via at least one of a satellite broadcast, a cable television transmission, a terrestrial television broadcast, and a network.

21. A non-transitory computer-readable storage medium having embedded therein instructions which, when executed by a computer, cause the computer to perform a method of providing an alert service, the method comprising:
receiving, without request from a user, a notification of availability to subscribe to the alert service;
providing the notification of availability to subscribe to the alert service for output on a display;
receiving a request, from the user in response to the notification being output on the display, to subscribe to the alert service;
registering a data source as a registered data source in response to receiving the request to subscribe to the alert service, the data source being a server or a broadcast signal that provides new content information for the alert service;
monitoring the new content information from the registered data source;
determining whether new content, corresponding to the alert service, is available from the registered data source based on the new content information;
determining whether the new content is targeted to users of one or more groups;
determining, if the new content is determined to be targeted to the users of the one or more groups, whether the user is included in the users of the one or more groups based on profiles, demographics, and interests (PDI) information; and
controlling, if the user is determined to be to be included in the users of the one or more groups, the display to present a pop-up alert based on the new content; and
controlling, if the new content is determined not to be targeted to the users of the one or more groups, the display to present the pop-up alert based on the new content.

22. An information providing apparatus, comprising:
a memory configured to store an application that includes a notification of availability to subscribe to an alert service, the application being associated with content to be received by a reception apparatus; and
circuitry configured to provide the application to the reception apparatus, wherein
the application identifies a data source, which is a server or broadcast signal, that provides new content information for the alert service, or a website that offers a subscription to the alert service and includes an identification of the data source that provides the new content information,
the identified data source is registered in a memory of the reception apparatus in response to a request to subscribe to the alert service from a user of the reception apparatus,
the new content information from the registered data source is monitored to determine whether new content corresponding to the alert service is available, whether the new content is targeted to users of one or more groups is determined, if the new content is determined to be targeted to the users of the one or more groups, whether the user of the reception apparatus is part of the one or more groups is determined based on profiles, demographics, and interests (PDI) information stored in the memory of the reception apparatus, if the user of the reception apparatus is determined to be part of the one or more groups, a pop-up alert is presented on a display based on the new content, and if the new content is determined not to be targeted to the users of the one or more groups, the pop-up alert is presented on the display based on the new content.

23. The reception apparatus according to claim 1, wherein the broadcast signal is a digital television broadcast signal, the circuitry includes a receiver that is configured to receive the digital television broadcast signal, and the notification of availability to subscribe to the alert service and an identification of the data source are provided by a broadcaster of the digital television broadcast signal.

\* \* \* \* \*